US006192714B1

(12) United States Patent
Dowlati et al.

(10) Patent No.: US 6,192,714 B1
(45) Date of Patent: Feb. 27, 2001

(54) FILAMENT FORMING APPARATUS AND A COOLING APPARATUS FOR AND METHOD OF COOLING A FILAMENT FORMING AREA

(75) Inventors: Ramin Dowlati, Gahanna; Seshadri Srinivasan, Worthington, both of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/386,817

(22) Filed: Aug. 31, 1999

(51) Int. Cl.[7] ..................................................... C03B 37/02
(52) U.S. Cl. ................................ 65/481; 65/498; 65/512
(58) Field of Search ............................... 65/498, 481, 512

(56) References Cited

U.S. PATENT DOCUMENTS

| 3,013,095 | 12/1961 | Russell . | |
|---|---|---|---|
| 3,708,271 | 1/1973 | Loewenstein et al. . | |
| 3,746,525 | 7/1973 | Kasuga et al. . | |
| 3,759,681 | * 9/1973 | Russell | 65/512 |
| 3,867,118 | * 2/1975 | Russell | 65/512 |
| 4,197,103 | 4/1980 | Ishikawa et al. . | |
| 4,214,884 | * 7/1980 | Martial | 65/512 |
| 4,330,311 | 5/1982 | Jensen . | |
| 4,332,602 | 6/1982 | Jensen . | |
| 4,566,890 | 1/1986 | Hostler et al. . | |
| 4,612,027 | 9/1986 | Marra . | |
| 4,662,922 | 5/1987 | Hill et al. . | |
| 4,824,457 | 4/1989 | Jensen . | |
| 4,995,892 | 2/1991 | Garrett et al. . | |
| 5,203,401 | 4/1993 | Hamburgen et al. . | |
| 5,244,483 | 9/1993 | Brosch et al. . | |
| 5,693,118 | 12/1997 | Snedden et al. . | |
| 5,709,727 | 1/1998 | Bobba . | |

* cited by examiner

Primary Examiner—John Hoffmann
(74) Attorney, Agent, or Firm—Inger H. Eckert (57) ABSTRACT

A filament forming apparatus and cooling apparatus for and method of cooling a filament forming area beneath a bushing is disclosed. The cooling apparatus includes a manifold with a cooling fluid channel formed therein, and a plurality of hollow cooling fins operatively coupled to the manifold. A cooling fluid flows into the manifold, through first and second fluid flow channels in the cooling fins, and back into the manifold from which it is subsequently discharged. Each cooling fin includes a plurality of divider members between the first and second fluid flow channels. Adjacent divider members define a small channel between each other. The cooling fluid flows from the first fluid flow channel through the small channels to the second fluid flow channel. The overall heat transfer coefficient is increased due to the forced convection of the surfaces of the cooling fin using a single-phase fluid passing through the cross-sectional area of a small channel. Further, divider members increase the surface area contact between the cooling fluid flow and the cooling fin walls. The cooling fluid in the fin may absorb enough heat to achieve two phase, liquid and vapor, flow. The bottom wall and/or side walls of the fin includes a plurality of holes through which the liquid and/or vapor in the fin may spray into the filament forming area. This spray enhances the cooling and quenching of the glass filaments in the filament forming area.

19 Claims, 8 Drawing Sheets

FILAMENT FORMING APPARATUS AND A COOLING APPARATUS FOR AND METHOD OF COOLING A FILAMENT FORMING AREA

TECHNICAL FIELD AND INDUSTRIAL APPLICABILITY OF THE INVENTION

This invention relates generally to an apparatus for and method of producing continuous glass filaments, and in particular, to an apparatus having a bushing and a cooling apparatus positioned beneath the bushing for cooling the filament forming area beneath the bushing. The invention is useful in the production of continuous glass filaments that may be used as reinforcement in molded resinous articles.

BACKGROUND OF THE INVENTION

In the manufacture of continuous glass filaments, glass is melted in a filament forming apparatus and flows to one or more bushings. Each bushing has a number of nozzles or tips through which streams of molten glass flow. The glass streams are mechanically pulled from the nozzles by a winding apparatus to form continuous glass filaments.

The temperature of the molten glass within the bushing must be high enough to maintain the glass in a liquid state. However, if the temperature is too high, the molten glass will not cool sufficiently so as to become viscous enough to form filaments after passing through the bushing tips. Thus, the glass must be quickly cooled or quenched after it flows from the bushing tips and forms glass filaments. If the glass cools too slowly, the glass filaments will break and the filament forming process will stop.

There are numerous apparatuses for cooling the glass filament forming area beneath a filament forming machine. Conventional cooling apparatuses use air, water, or both to transfer heat from the filament forming area beneath a bushing and cool the glass filaments.

Figure 1:
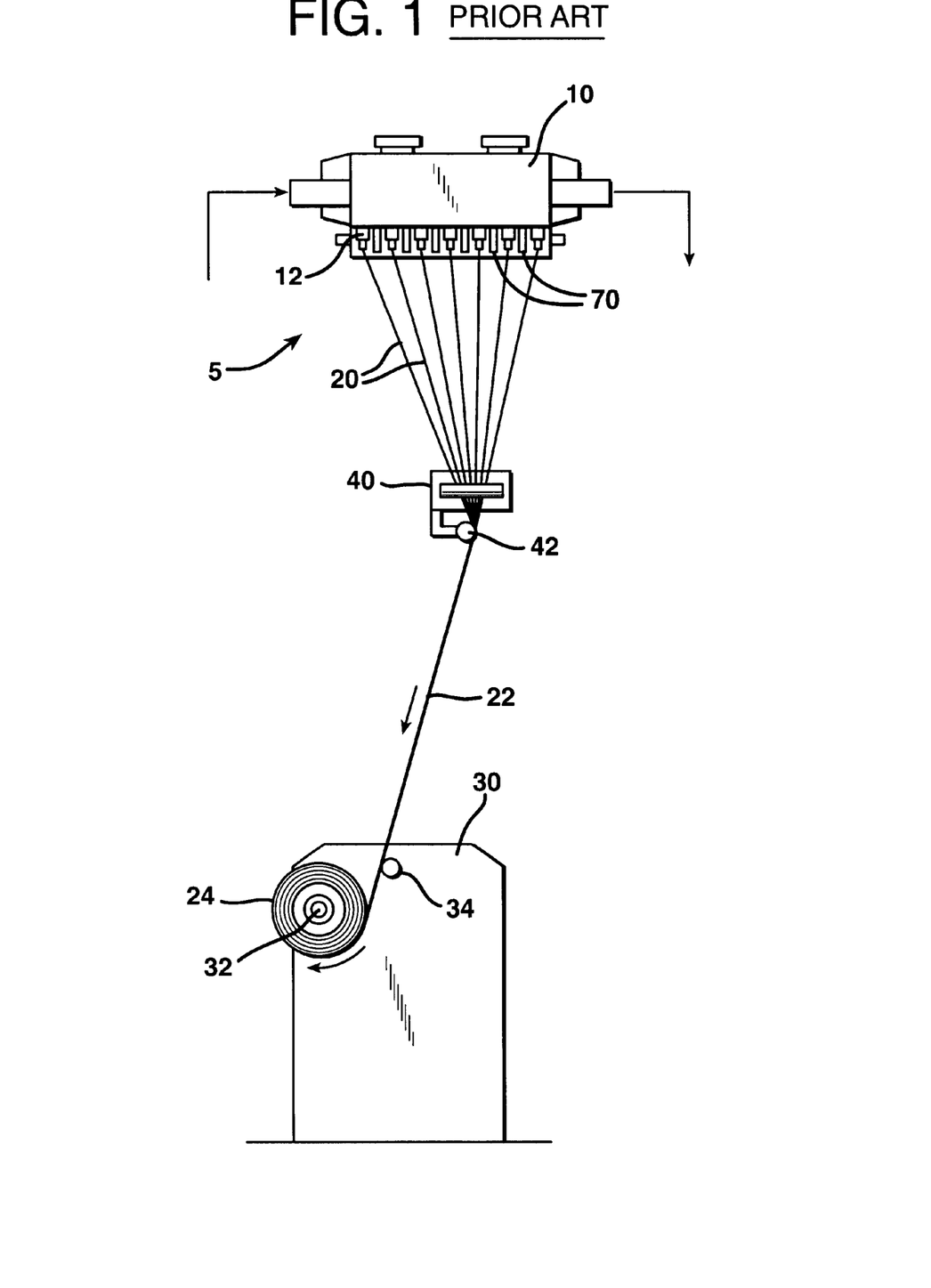
FIG. 1 is a schematic view of a conventional glass filament forming apparatus with a cooling apparatus.
Figure 2:
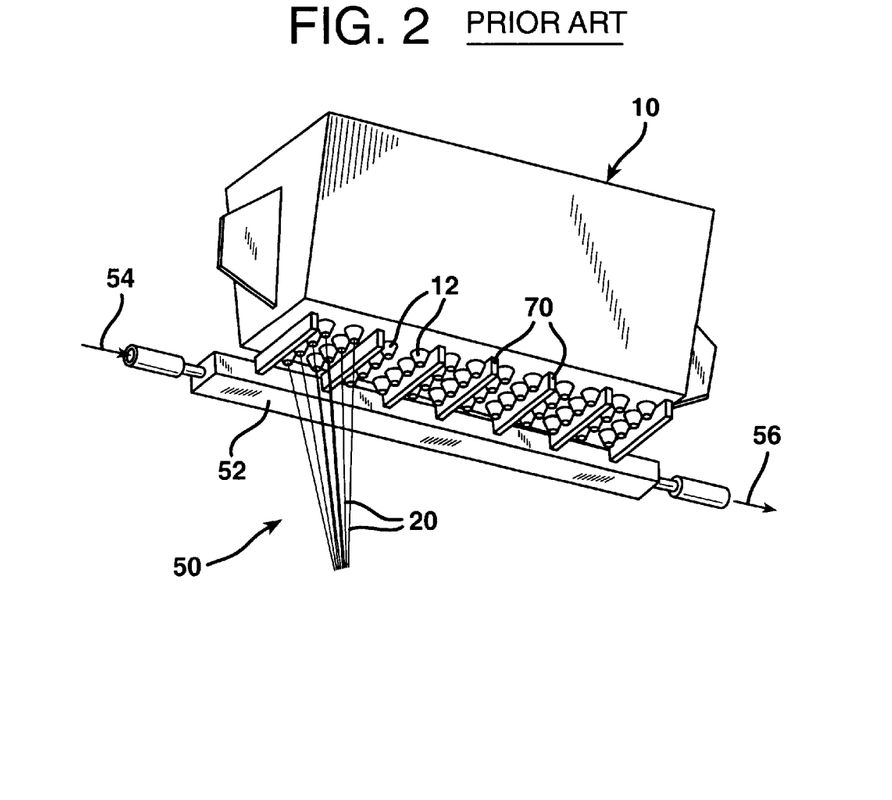
FIG. 2 is a schematic perspective view of the forming and cooling apparatuses of FIG. 1.

An example of a glass filament forming apparatus is disclosed in U.S. Pat. No. 3,708,271 to Loewenstein et al., the disclosure of which is expressly incorporated herein by reference. A conventional glass filament forming apparatus 5 with a cooling apparatus 50 is shown in FIGS. 1 and 2. Filaments 20 are drawn from a plurality of nozzles 12 of a bushing 10 and gathered into a strand 22 by a roller 42. Size is applied to coat the filaments by a size applicator 40. A reciprocating device 34 guides strand 22, which is wound around a rotating collet 32 in a winding apparatus 30 to build a cylindrical package 24.

Cooling apparatus 50 is located beneath the bushing 10 to cool the filament forming area 14. As shown in FIG. 2, cooling apparatus 50 includes a manifold 52. Manifold 52 preferably includes one or more internal channels that extend along the longitudinal axis of the manifold 52.

Cooling apparatus 50 includes a plurality of cooling fins 70. Each cooling fin 70 is a solid, thin strip of metal, such as copper. Cooling fins 70 may be cantilevered from a single water-cooled manifold or may be secured at each end to a pair of water-cooled manifolds. Each cooling fin 70 extends between adjacent rows of nozzles 12. Filaments 20 drawn from the bushing 10 pass on either side of a cooling fin 72.

Heat from the glass is radiantly and convectively transferred to the fins 70 as the glass flows from the nozzles 12 and is drawn into free continuous filaments 20. The heat passes conductively through the fins 70 and to the water-cooled manifold 52. Cooling fins 70 increase the surface area of the cooling apparatus 50, thereby increasing the amount of heat that can be transferred from the filament forming area.

A cooling fluid supply 54, such as water, enters the manifold 52, travels through a channel, and exits the opposite end of the manifold as a cooling fluid return 56. The cooling fluid absorbs heat as it flows through the manifold 52, thereby cooling the manifold 52, cooling fins 70, and indirectly, the filament forming area 14.

The amount of heat that this cooling apparatus can remove from the filament forming area 14 is limited. Heat must travel through the cooling fins 70 and manifold 52 before it is absorbed by the cooling fluid flowing through the manifold.

Figure 3:
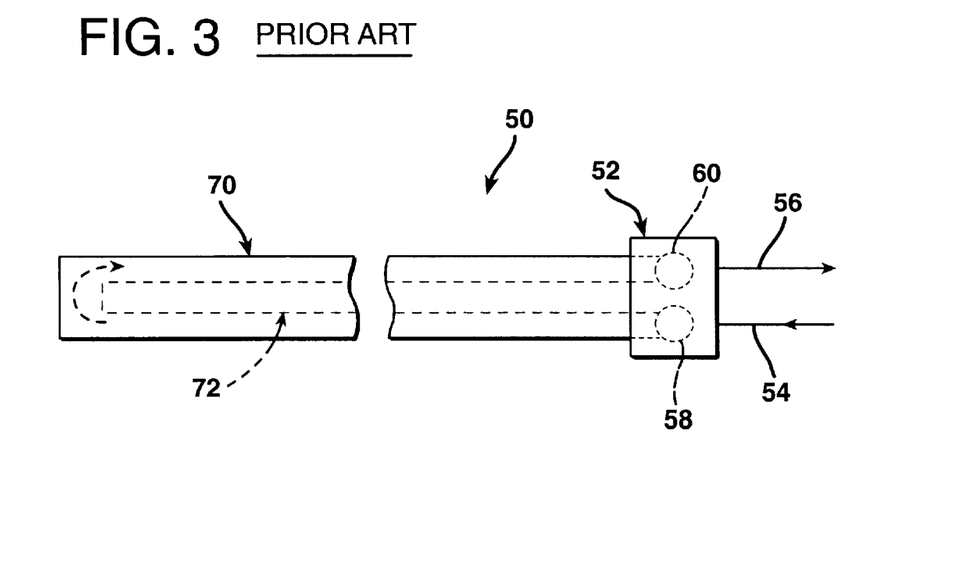
FIG. 3 is a side view of a conventional cooling apparatus.

Another conventional cooling apparatus having a manifold 52 and cooling fins 70 is shown in FIG. 3. Examples of this type of known cooling apparatus are disclosed in U.S. Pat. No. 3,746,525 to Kasuga et al., U.S. Pat. No. 4,824,457 to Jensen, and U.S. Pat. No. 5,244,483 to Brosch et al.

Manifold 52 includes two cooling fluid channels 58, 60. Initially, cooling fluid flows into channel 58 via cooling fluid supply 54. The cooling fluid flows from the manifold 52 into and around the U-shaped passage 72 in the cooling fin 70 and exits the fin 70 into channel 60. The cooling fluid exits the manifold 52 through fluid return 56. As apparent to the artisan, this cooling apparatus 50 removes more heat from the filament forming area than the apparatus in FIGS. 1 and 2 because water flows inside of the cooling fins 70. However, the amount of heat that can be absorbed by the cooling fluid in cooling apparatus 50 is still limited.

If heat can be more rapidly removed from the filament forming area beneath a bushing, the operating temperatures of the bushing and the molten glass in the bushing can be increased, thereby allowing overall throughput to be increased. Accordingly, there is a need for improved apparatus for and method of cooling a filament forming area beneath a bushing to remove a greater amount of heat.

SUMMARY OF THE INVENTION

The shortcomings of the prior art are overcome by the disclosed filament forming apparatus and cooling apparatus for and method of cooling a filament forming area beneath a bushing. The cooling apparatus includes a manifold with a cooling fluid channel formed therein, and a plurality of hollow cooling fins operatively coupled to the manifold. A cooling fluid flows into the manifold, through first and second fluid flow channels in the cooling fins, and back into the manifold from which it is subsequently discharged. Each cooling fin includes a plurality of divider members between the first and second fluid flow channels. Adjacent divider members define a small channel between each other. The cooling fluid flows from the first fluid flow channel through the small channels to the second fluid flow channel. The overall heat transfer coefficient is increased due to the forced convection of the surfaces of the cooling fin using a single-phase fluid passing through the cross-sectional area of a small channel. Further, divider members increase the surface area contact between the cooling fluid flow and the cooling fin walls.

The cooling fluid in the fin may absorb enough heat to achieve two phase, liquid and vapor, flow. The bottom wall and/or the side walls of the fin include a plurality of holes through which the liquid and/or vapor in the fin may spray into the filament forming area. This spray enhances the cooling and quenching of the glass filaments in the filament forming area.

DETAILED DESCRIPTION AND PREFERRED EMBODIMENTS OF THE INVENTION

An apparatus for cooling the filament forming area beneath a bushing embodying the principles of the invention is illustrated in FIGS. 4–8D. The disclosed cooling apparatus improves the forming process of glass filaments, particularly by cooling the filament forming area and thereby permitting a higher operating temperature in the bushing and an increase in the throughput. The cooling apparatus utilizes a cooling fluid that flows into a manifold, through a plurality of cooling fins, and back to the manifold. Each cooling fin includes divider members that define small channels through which the cooling fluid in the cooling fin flows to increase the heat transferred from the filament forming area.

A conventional glass filament forming apparatus with a cooling apparatus is shown in FIG. 1. Glass filament forming apparatus 5 may be of any conventional design, such as that disclosed in U.S. Pat. No. 4,662,922 to Hill et al., the disclosure of which is expressly incorporated herein by reference.

Figure 4:
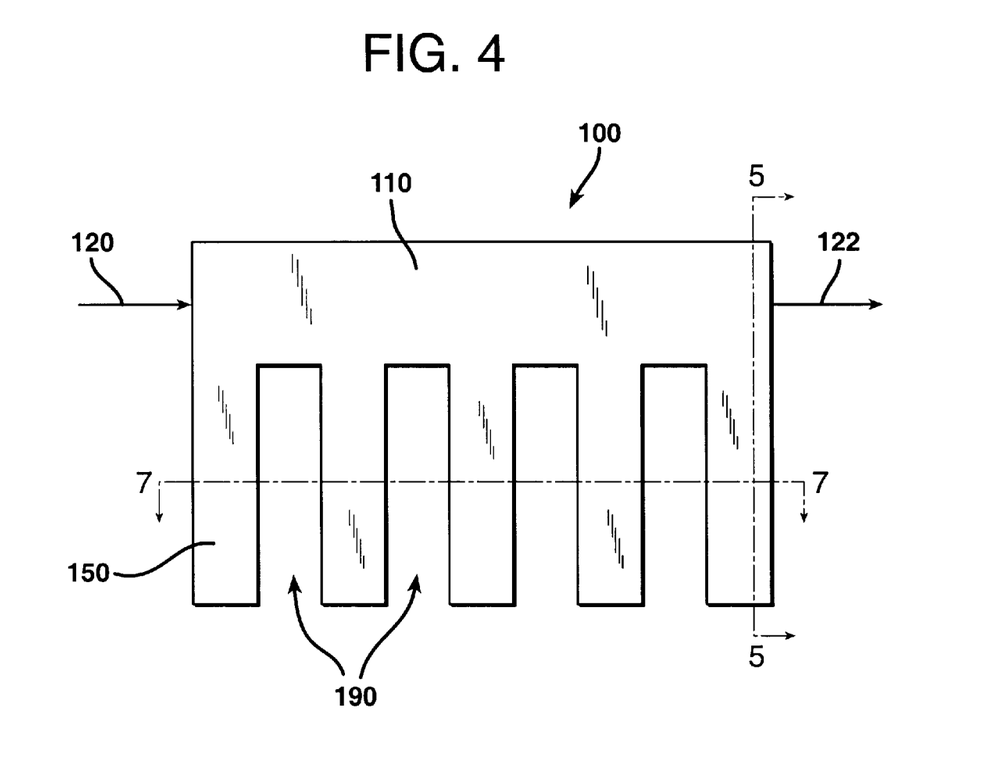
FIG. 4 is a top view of a cooling apparatus embodying the principles of the invention.
Figure 5:
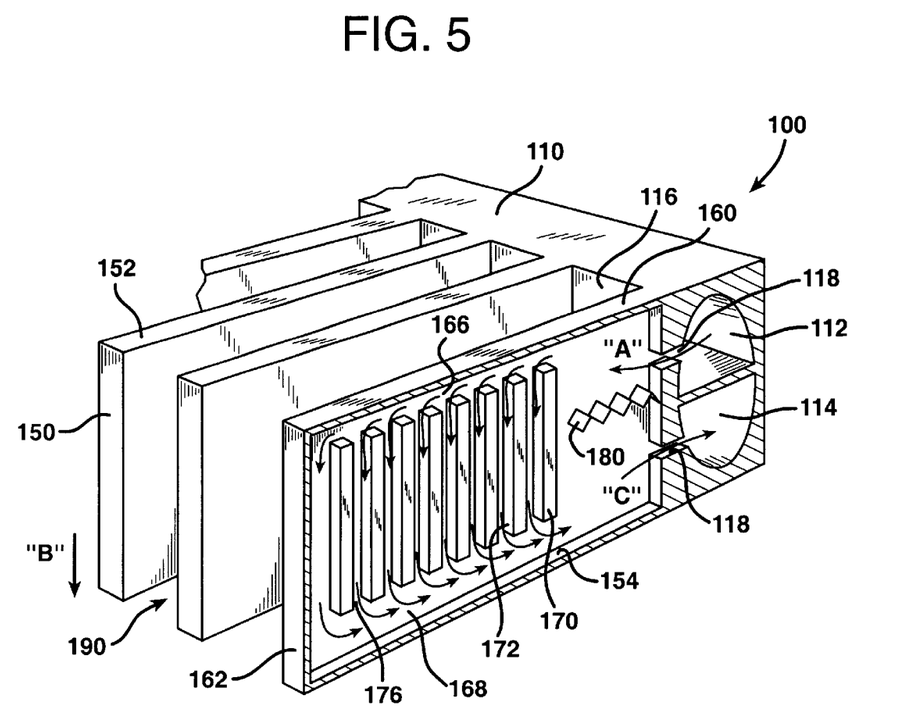
FIG. 5 is a perspective cross-sectional view of the cooling apparatus of FIG. 4 taken along the lines "5"—"5" in FIG. 4.

A cooling apparatus embodying the principles of the invention is shown in FIGS. 4 and 5. Cooling apparatus 100 includes a manifold 110 and a plurality of cooling fins 150 coupled to the manifold 110. Cooling apparatus 100 is mounted in a filament forming area beneath a bushing, essentially as shown in FIG. 2.

Manifold 110 includes a mounting surface 116 and internal channels 112, 114 extending along its longitudinal axis as shown in FIG. 5. Channels 112, 114 are for a cooling fluid supply and a cooling fluid return, respectively. The channels 112, 114 are in fluidic communication with each fin 150 through openings 118 formed in the manifold 110.

Cooling apparatus 100 includes a plurality of hollow cooling fins 150 integrally coupled to the manifold 110. Each cooling fin 150 is spaced from an adjacent fin with the spaces 190 between the fins 150 enabling the fins to be mounted between individual rows of bushing nozzles to permit glass filaments to pass on either side of the fins.

Cooling fins 150 are rectangular in shape and include a top wall 152, bottom wall 154, side walls 158, and first and second ends 160, 162 that define a fin cavity. Cooling fins 150 are coupled to the manifold 110 at their first ends 160. Cooling fins have an end wall at their second end 162

Each fin 150 includes spaced divider members 170 inside of the fin 150. A first fluid flow channel 166 is defined between the top surfaces of the divider members 170 and the top wall 152 of the fin 150. A second fluid flow channel 168 is defined between the bottom surfaces of the divider members 170 and the bottom wall 154 of the fin 150.

Each divider member 170 extends between side walls 158 of the fin 150. The divider members 170 include side surfaces 172 and are spaced to define narrow channels 176 therebetween. These channels 176 are also referred to as "micro-channels." Cooling fluid flows from the first fluid flow channel 166 to the second fluid flow channel 168 through a micro-channel 176.

A flow separator 180 directs fluid from opening 118 to channel 166 and from channel 168 to opening 118. Any suitable structure that conducts or guides flow is suitable, in the illustrated embodiment see flow separator 180.

The operation of the cooling apparatus is now explained with reference to FIGS. 4 and 5. A cooling fluid is introduced into channel 112 of manifold 110 through a fluid supply 120. The cooling fluid enters each cooling fin 150 through a respective opening 118 and travels to the first fluid flow channel 166 along the direction of arrow "A" in FIG. 5. As the fluid flows in the first fluid flow channel 166, portions of the fluid flow through each micro-channel 176 along the direction of arrow "B". The fluid flowing through the micro-channels 170 enters into the second fluid flow channel 168 and flows along the direction of arrow "C". The cooling fluid exits the fin 150 through an opening 118 and flows into channel 114, from which it is discharged from the manifold 110 through return 122.

Heat from the glass is transferred to the fins both radiantly and, via the ambient air surrounding the fins and glass, convectively as the glass is drawn into free continuous filaments 20. The heat is also transferred conductively and convectively from the fin's outer surfaces to the inner surfaces and subsequently transferred to the water-cooled manifold 110. Cooling fins 150 increase the surface area of the cooling apparatus 100, thereby increasing the amount of heat that is transferred from the filament forming area.

Heat is absorbed by the cooling fluid as the fluid contacts the top, bottom, and side walls of a fin. The heat transfer between the cooling fluid and the fin is increased in two ways by the divider members. First, the amount of fin surface area in contact with the cooling fluid is increased. Second, the heat transfer coefficient inside the fin is increased by having the forced convection of a hot surface using a single-phase (liquid) fluid passing through a small cross-sectional area (the micro-channel). The heat absorbed by the cooling fluid may be sufficient to evaporate some of the fluid and develop into a two phase (vapor and liquid) flow exiting the micro-channels. A colder and more uniform temperature profile across the outer surface of the fin is achieved by the cooling apparatus with the divider members.

The cooling fluid may flow through the micro-channels either upwardly or downwardly. While a downward fluid flow is assisted by gravity, additional pressure to overcome the effect of gravity is required for an upward fluid flow through the micro-channels, in which case the flow direction of the cooling fluid in the fin would be reversed.

The components of the cooling apparatus, including the manifold and the cooling fin, are preferably metal, such as copper or nickel.

The following dimensions are provided for an exemplary apparatus and method embodying the principles of the invention:

length of fin=2–4 in. (5.08–10.16 cm.)
width of fin=0.08–0.2 in. (0.2–0.51 cm.)
height of fin=1–2 in. (2.54–5.08 cm.)
length of divider member=50–80% of fin height
width of divider member=0.02–0.08 in. (0.5–2 mm.)

width of micro-channels in fin=0.04–0.08 in. (1–2 mm.)
fluid flow velocity into a fin=788 ft/s (20 m/s)
number of channels=5–15

As the artisan will appreciate, the dimensions and flow rates identified above may be adjusted to achieve any desired rate of heat transfer from the filament forming area.

The artisan will also appreciate that there are many possible variations on the particular embodiment described above that would be consistent with the principles of the invention.

Figure 6A:
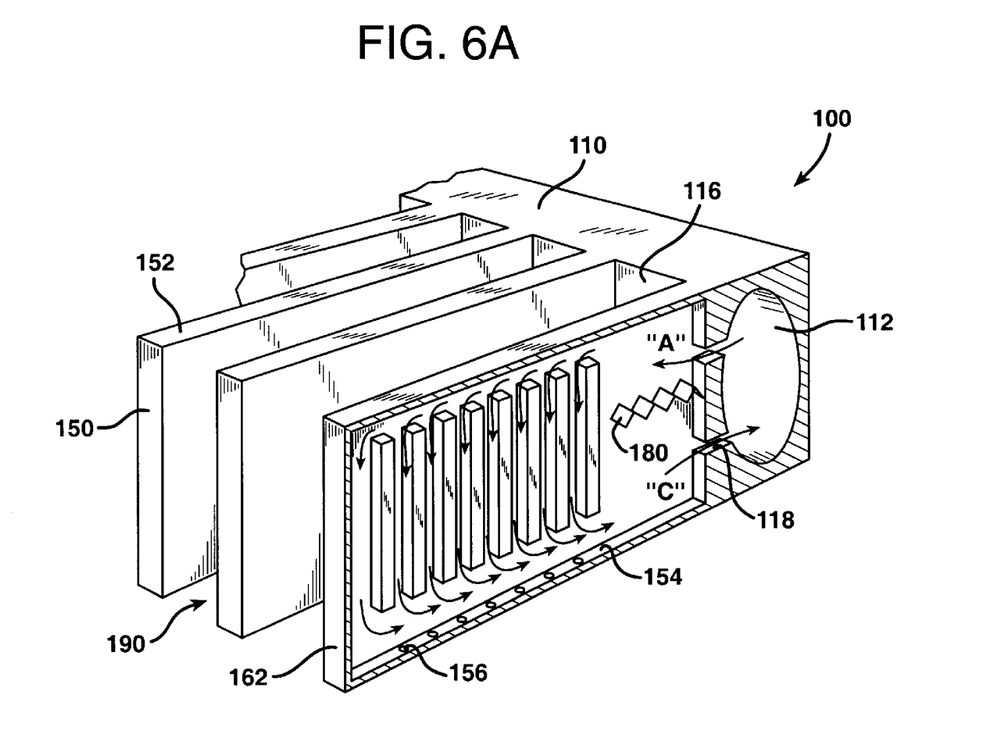
FIGS. 6A–B are perspective cross-sectional views of alternate embodiments of a cooling apparatus.
Figure 6B:
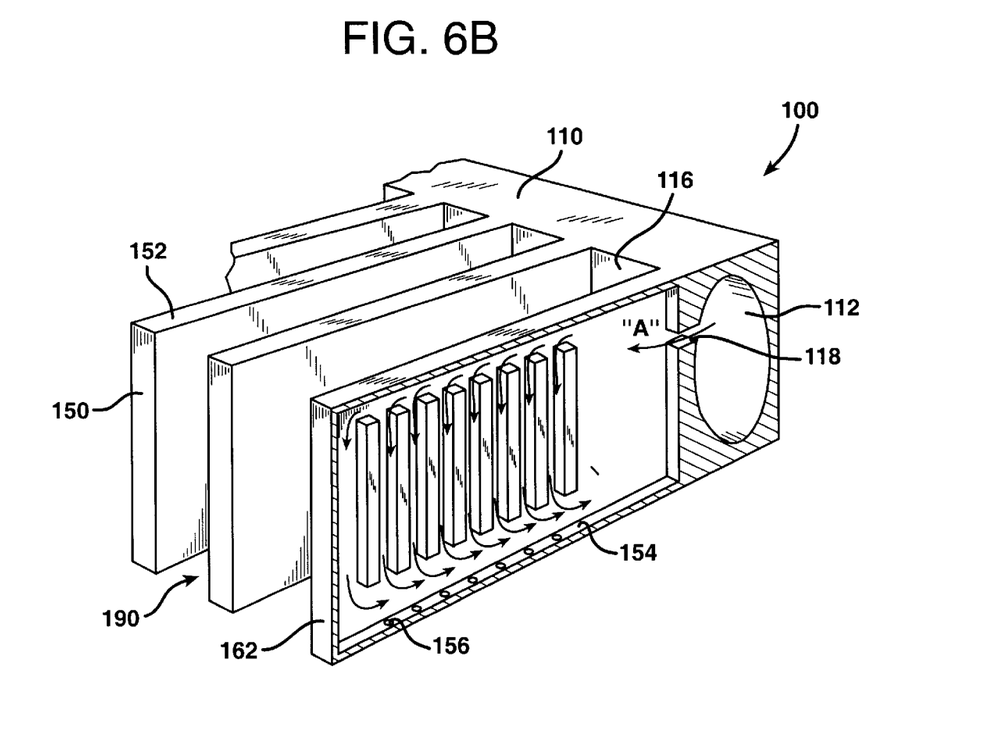

For example, alternate embodiments of a cooling fin are shown in FIGS. 6A–6B. The bottom wall 154 or the side wall 158 of a fin 150 may include holes 156 through which vapor and/or liquid in the fin 150 may be sprayed into the filament forming area. Since the sprayed liquid or vapor is the cooling fluid that has absorbed heat from the fin, the second channel 114 in the manifold 110, previously used to return the heated fluid, may be eliminated. Holes 156 permit either one opening (as shown in FIG. 6B) or two openings (as shown in FIG. 6A) between the fin 150 and the manifold 110 to be used.

While the cooling fins as described above have a rectangular shape, the fins may be any shape appropriate to achieve the desired cooling of the filament forming area.

Figure 7:
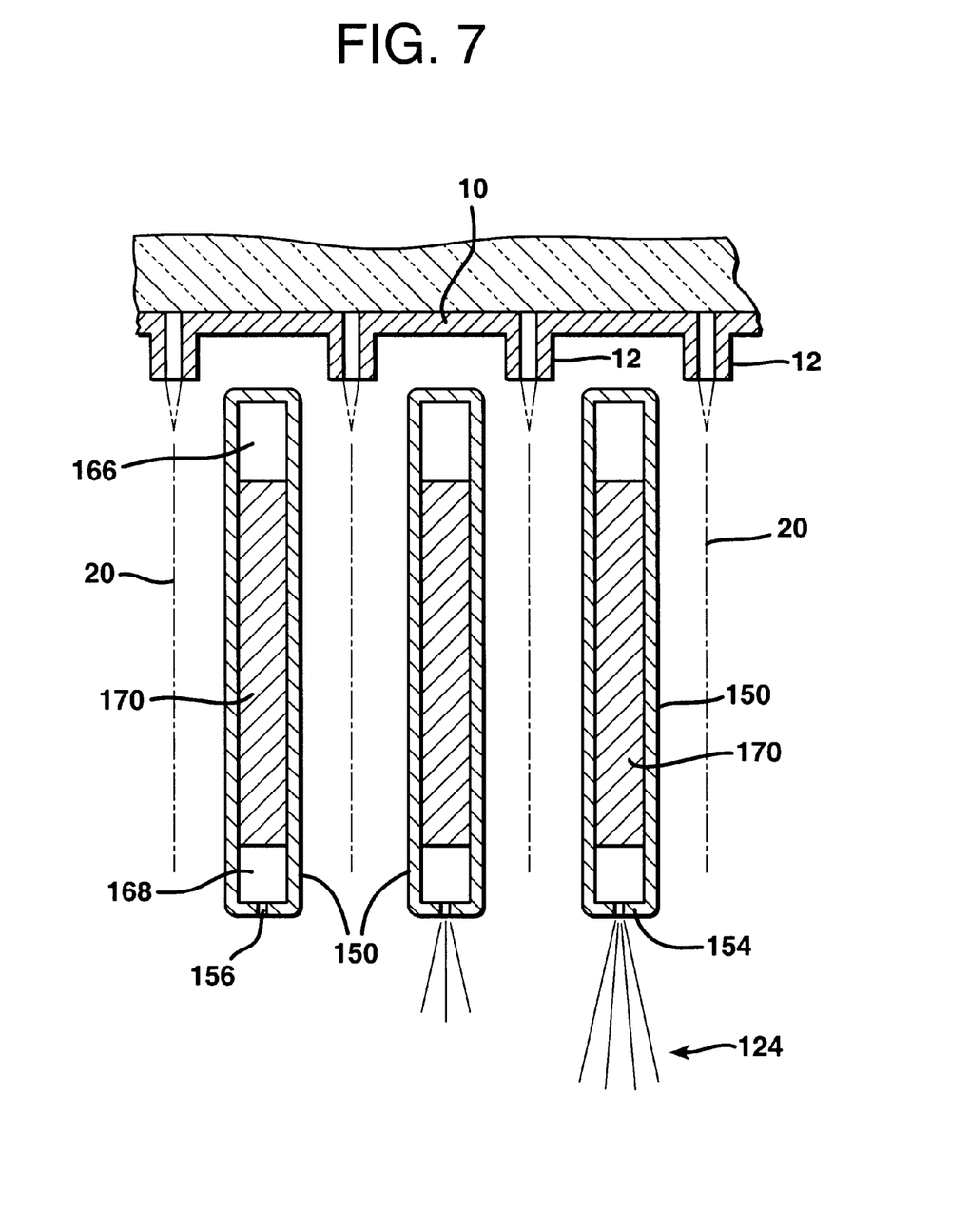
FIG. 7 is an end cross-sectional view of the fins of the cooling apparatus of FIGS. 6A–B taken along the lines "7"—"7" in FIG. 4.

The positions of the cooling fins 150 relative to the bushing 10 and filaments 20 are shown in FIG. 7. Each fin 150 is mounted between rows of nozzles 12 with side walls 158 that are substantially parallel to the glass filaments. The spray 124 exits outwardly from holes 156 in the fins 150 into the filament forming area.

The manifold may have more than two channels dependent on the manifold size and the desired cooling fluid flow rate.

Another alternative is that the cooling fins may be formed separate from and secured to the manifold by welding, brazing, or other know connecting means.

Figure 8A:
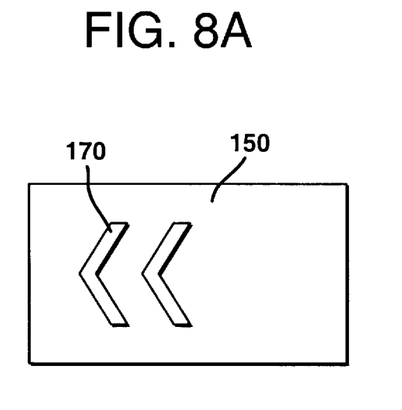
FIGS. 8A–D are cross-sectional views showing alternate embodiments of the divider members.
Figure 8B:
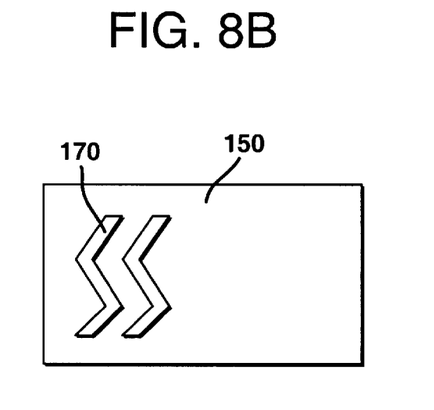
Figure 8C:
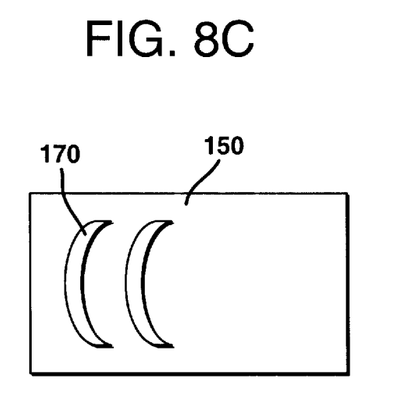

The artisan will appreciate that the divider members in the fins may be any desired shape or size that permits cooling fluid to flow through the micro channels. Examples of divider members are shown in FIGS. 8A–8C.

Figure 8D:
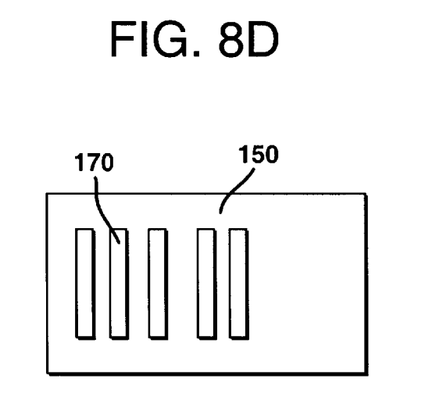

Further, the spacing between the divider members may be varied as shown in FIG. 8D. While the micro-channels between the divider members should be narrow enough to achieve the desired heat transfer, the width of the micro-channels may be varied. The micro-channel widths may be larger or smaller the width of adjacent micro-channels in order to obtain variation of cooling rates along the fin, dependent on the location of the external heat source. Also, the divider members may be formed integrally with or separately from the fins.

Another alternative is that any number of divider members may be included in a fin based on the heat transfer desired, the cooling fluid flow rate, and the spacing between the divider members.

We claim:

1. A cooling apparatus for cooling the glass filament forming area beneath a bushing comprising:
    a manifold defining a channel and an opening in communication with said channel; and
    a hollow cooling fin having a top wall, a bottom wall, side walls, and an end wall defining therebetween a fin cavity, and a plurality of divider members disposed within said fin cavity, wherein a fin end is coupled to said manifold with said fin cavity in fluidic communication with said manifold channel, said top wall and said divider members defining therebetween a first fluid flow channel, said bottom wall and said divider members defining a second fluid flow channel, adjacent divider members defining therebetween a micro-channel, said micro-channel including a first end in fluidic communication with said first fluid flow channel and a second end in fluidic communication with said second fluid flow channel, and wherein a cooling fluid can be introduced from said manifold channel to said first fluid flow channel, said micro-channel, and said second fluid flow channel at a sufficient temperature and pressure to transfer heat from the glass filament forming area.

2. The cooling apparatus of claim 1, wherein each of said divider members includes a longitudinal axis, each said divider member longitudinal axis being oriented perpendicularly with respect to at least one of said fin top and bottom walls.

3. The cooling apparatus of claim 1, wherein each of said divider members includes a side surface that defines a portion of a micro-channel, said side surface being oriented parallel with respect to side surfaces on other divider members.

4. The cooling apparatus of claim 1, wherein each of said divider members is rectangular in shape.

5. The cooling apparatus of claim 1, wherein said fin comprises at least three divider members, each of said divider members defining a micro-channel with an adjacent divider member, said micro-channels being parallel to each other.

6. The cooling apparatus of claim 5, wherein the width of one of said micro-channels is larger than the width of another of said micro-channels.

7. The cooling apparatus of claim 1, wherein said manifold defines two openings in fluidic communication with said fin cavity.

8. The cooling apparatus of claim 1, wherein said manifold defines two channels extending along its longitudinal axis.

9. The cooling apparatus of claim 8, wherein said manifold defines two openings, each of said openings being in fluidic communication with a respective one of said manifold channels.

10. The cooling apparatus of claim 1, wherein said fin bottom wall includes a plurality of holes to permit liquid or vapor in said fin cavity to be discharged from said cavity into said filament forming area.

11. The cooling apparatus of claim 1, wherein said fin includes a flow separator located adjacent to said fin end to divide said first and second fluid flow channels.

12. The cooling apparatus of claim 1, further comprising:
    a plurality of fins coupled to said manifold to provide cooling fluid adjacent to the bushing at a sufficient temperature and pressure to transfer heat from the glass filament forming area.

13. An apparatus for producing continuous glass filaments comprising:
    a bushing for supplying streams of molten glass to be drawn into continuous glass filaments; and
    a cooling apparatus for cooling the glass filament area beneath said bushing, said cooling apparatus including:
        a manifold defining a channel and an opening in communication with said channel; and
        a hollow cooling fin having a top wall, a bottom wall, side walls, and an end wall defining therebetween a fin cavity, and a plurality of divider members disposed within a fin cavity, wherein said fin end is coupled to said manifold with said fin cavity in fluidic communication with said manifold channel, said top wall and said divider members defining therebetween a first fluid flow channel, said bottom wall and said divider members defining therebetween a second fluid flow channel, adjacent divider members defining therebetween a micro-channel, said micro-channel including a first end in fluidic communication with said first fluid flow channel and a second end in fluidic communication with said second fluid flow channel, and wherein a cooling fluid can be introduced from said manifold channel through said first fluid flow channel, said micro-channel, and said second fluid flow channel at a sufficient temperature and pressure to transfer heat from the glass filament forming area.

14. The cooling apparatus of claim 13, wherein each of said divider members includes a side surface that defines a portion of a micro-channel, said side surface being oriented parallel with respect to side surfaces on other divider members.

15. The cooling apparatus of claim 13, wherein said fin comprises at least three divider members, each of said divider members defining a micro-channel with an adjacent divider member, the width of one of said micro-channels being larger than the width of another of said micro-channels.

16. The cooling apparatus of claim 13, wherein said fin bottom wall includes a plurality of holes to permit liquid or vapor in said fin cavity to be discharged from said cavity into said filament forming area.

17. The cooling apparatus of claim 13, further comprising:

a plurality of fins coupled to said manifold to provide cooling fluid adjacent to the bushing at a sufficient temperature and pressure to transfer heat from the glass filament forming area.

18. A method of cooling a filament forming area beneath a bushing comprising the steps of:

disposing adjacent said filament forming area a hollow cooling fin having top, bottom, end, and side walls defining therebetween a fin cavity and having disposed in said fin cavity divider members defining therebetween and with said walls a first fluid flow channel and a second fluid flow channel, adjacent divider members defining a micro-channel therebetween, said micro-channel including a first end in fluidic communication with said first fluid flow channel and a second end in fluidic communication with said second fluid flow channel; and introducing cooling fluid into said first fluid flow channel and through said micro-channel and said second fluid flow channel at a sufficient temperature and pressure to transfer heat from the filament forming area.

19. The method of claim 18, wherein fin includes a plurality of holes disposed in at least one of said fin walls and said fin bottom wall, and the method further comprises the step of spraying liquid or vapor from said fin through said holes into said filament forming area.

* * * * *